US009923887B2

(12) United States Patent
Sojoodi et al.

(10) Patent No.: US 9,923,887 B2
(45) Date of Patent: Mar. 20, 2018

(54) PUSH NOTIFICATION ACTIVATION

(71) Applicant: Pivotal Software, Inc., Palo Alto, CA (US)

(72) Inventors: Sina Sojoodi, Palo Alto, CA (US); Joshua Paul Balla Winters, Palo Alto, CA (US); Mark Anthony D'Cunha, Palo Alto, CA (US); Tanzeeb Rahman Khalili, Palo Alto, CA (US); Dwayne Elsworth Forde, Palo Alto, CA (US); Matthew Leonard Robert Smith, Palo Alto, CA (US); Robert Szumlakowski, Palo Alto, CA (US); Ernst Siegfried Norman Riemer, Palo Alto, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

(21) Appl. No.: 15/250,853

(22) Filed: Aug. 29, 2016

(65) Prior Publication Data

US 2017/0064024 A1 Mar. 2, 2017

Related U.S. Application Data

(60) Provisional application No. 62/210,914, filed on Aug. 27, 2015.

(51) Int. Cl.
*H04W 4/02* (2009.01)
*H04L 29/08* (2006.01)
*G06F 9/54* (2006.01)
*H04L 29/06* (2006.01)
*G06F 9/445* (2018.01)

(52) U.S. Cl.
CPC ............ *H04L 63/0823* (2013.01); *G06F 8/65* (2013.01); *G06F 9/542* (2013.01); *H04L 63/04* (2013.01); *H04L 63/083* (2013.01); *H04L 67/1095* (2013.01); *H04L 67/16* (2013.01); *H04L 67/18* (2013.01); *H04L 67/26* (2013.01); *H04W 4/023* (2013.01)

(58) Field of Classification Search
CPC ........ H04L 67/26; H04L 67/18; H04W 4/023; H04W 4/02; H04W 4/12; H04W 4/14; G06F 9/542; G06F 9/546
USPC ............................................... 455/456.1–457
See application file for complete search history.

(56) References Cited

U.S. PATENT DOCUMENTS 7,541,940 B2 * 6/2009 Upton ....................... G08B 1/08
340/686.1
2008/0032703 A1 2/2008 Krumm et al.
2008/0188241 A1 8/2008 Mo et al.
(Continued)

OTHER PUBLICATIONS

International Search Report and the Written Opinion of the International Searching Authority dated Jan. 5, 2017 for related PCT Application No. PCT/US2016/049328 filed Aug. 29, 2016, 11 pages.

*Primary Examiner* — Marisol Figueroa
(74) *Attorney, Agent, or Firm* — Mahamedi IP Law LLP

(57) ABSTRACT

A mobile computing device is operated to receive a trigger at a first instance. The trigger may be associated with a predefined condition or event or action. The mobile computing device may detect the predefined condition or event at a second instance. In response to detecting the predefined condition or event, a notification is activated on the mobile computing device that is based on the trigger.

20 Claims, 6 Drawing Sheets

(56) References Cited

U.S. PATENT DOCUMENTS

| | | | |
|---|---|---|---|
| 2009/0061833 A1* | 3/2009 | Ho | H04M 1/72552 455/414.2 |
| 2011/0060807 A1* | 3/2011 | Martin | G06F 17/3087 709/217 |
| 2012/0088523 A1 | 4/2012 | Shirakawa et al. | |
| 2013/0084896 A1 | 4/2013 | Barkie et al. | |

* cited by examiner

US 9,923,887 B2

PUSH NOTIFICATION ACTIVATION

RELATED APPLICATIONS

This application claims benefit of priority to Provisional U.S. Patent Application No. 62/210,914, filed Aug. 27, 2015; the aforementioned priority application being hereby incorporated by reference in its entirety.

TECHNICAL FIELD

Examples described herein relate to a notification system for providing a network service.

DETAILED DESCRIPTION

Figure 1:
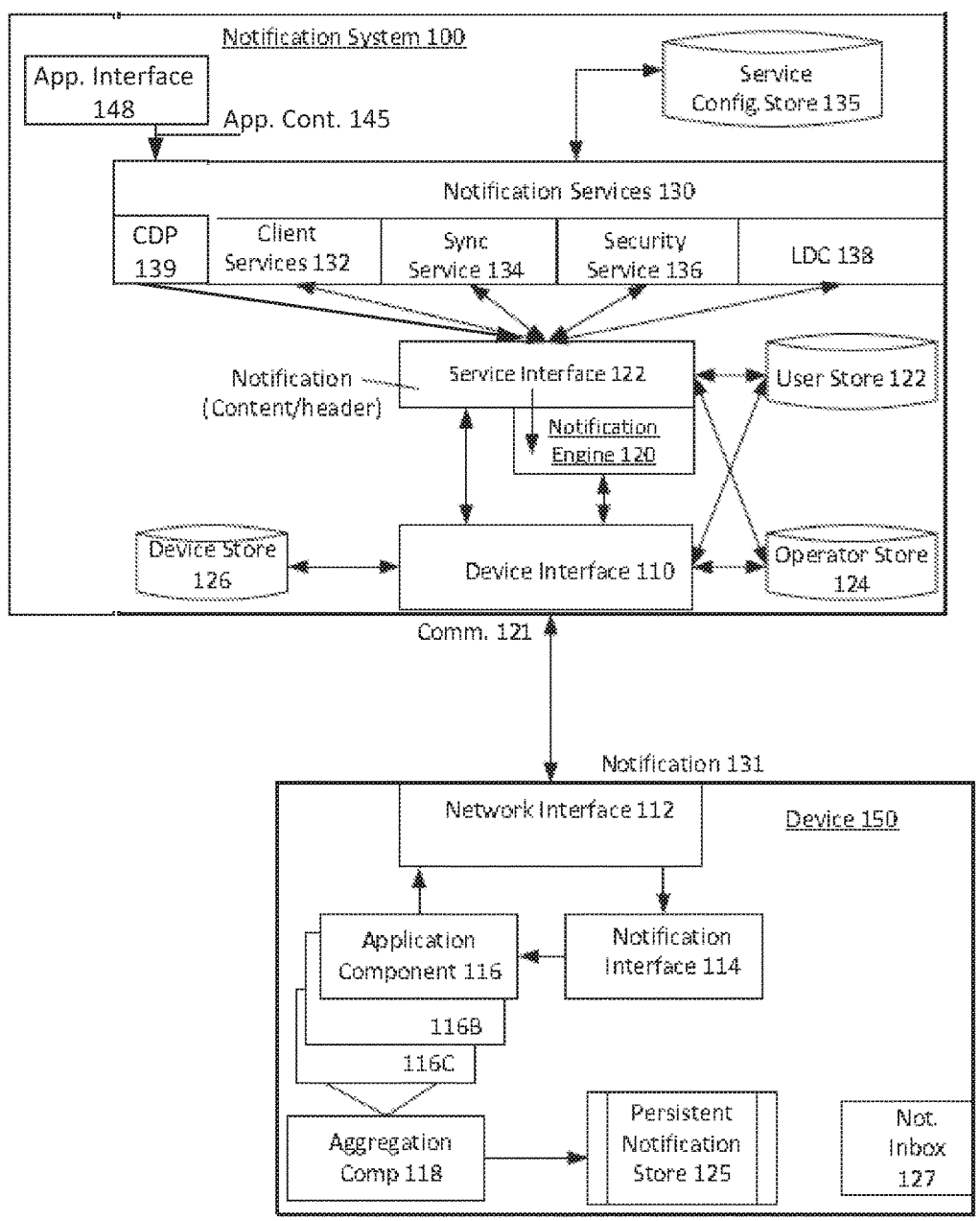
FIG. 1 illustrates a notification system for providing notification services to end user devices.

According to some examples, a mobile computing device is operated to receive a trigger at a first instance. The trigger may be associated with a predefined condition or event. The mobile computing device may detect the predefined condition or event at a second instance. In response to detecting the predefined condition or event, a notification is activated on the mobile computing device that is based on the trigger.

Still further, according to some examples, a mobile computing device may use network resources to receive notification data from an external source for a notification. The mobile computing device may store a notification that is based on the notification data, where the notification is associated with data that defines a condition for triggering the notification. The mobile computing device may detect an occurrence of the condition using local resources of the mobile computing device, and then locally activate the notification without use of the network resources.

In some examples, a network application data set is updated when a corresponding local application data set is updated on a mobile computing device. One or more other devices are determined that each include a respective corresponding local application data set. A push notification is sent to each of the one or more other devices to trigger each of the one or more other devices to update the corresponding application data set of that device.

In some examples, a mobile computing device is operated to receive a request for authentication from a second computer system. The request may be received in connection with a communication exchange between the mobile computing device and the second computer system. Based on the request from the second computer system, a credential is identified for use by the first computer system in the communication exchange. A push notification is sent to the mobile computing device to trigger the mobile computing device to use the credential in the communication exchange.

Still further, in other examples, a mobile computing device is operated to monitor a set of applications to identify one or more push notifications which are received through execution of each application of the set. The one or more push notifications identified for each application are aggregated. The mobile computing device may provide a data structure to represent the aggregated push notifications for each application.

In some examples, a computer system (e.g., network service) operates to identify a content data set for transmission to a mobile computing device. The content data set is segmented into multiple content segments. Each of the multiple content segments is sent as a push notification to the mobile computing device. Additionally, a metadata set is provided to the mobile computing device which specifies a configuration for assembling the multiple content segments on the mobile computing device.

Examples described include a system for providing push notifications to end user or operator devices in connection with one or more kinds of network services. According to some examples, a system is provided which implements network services using push notifications. In such examples, the use of push notifications enables functionality, technical advantages and benefits which otherwise would not have equivalents under conventional approaches. Still further, in some examples, systems are described for enabling operation of end user or operator devices to receive and use push notifications in connection with network services, in a manner that augments or enhances functionality and/or use of network services by the devices.

FIG. 1 illustrates a notification system for providing notification services to end user devices. A notification system 100 may include multiple servers and other computing resources that provide various services in connection with one or more applications that are installed on end user devices. As shown by an example of FIG. 1, an end user or operator device 150 can correspond to a variety of different computing devices and platforms which may be used by users/operators of different classes or categories, including network administrators, administered users (e.g., users on an enterprise network), and end users operating their own devices. By way of example, the mobile device 150 can correspond to a mobile computing device, such as a wireless/telephony multipurpose (e.g., messaging, voice) device (e.g., smart phones or feature phones), tablet, wearable electronic device, gaming console, set-top box, connected car console, laptop, or personal computer (e.g., desktop or portable).

The notification system 100 can implement one or more notification services in providing notifications to end user computing devices. In many examples, the notifications can be in the form of "push" notifications, meaning the trigger for generating and sending a notification originates with the sender, which is in contrast to pull notifications, where a receiving device requests or otherwise initiates the other device to send a communication.

In an example of FIG. 1, a notification system 100 includes a device interface 110, a notification engine 120, a service interface 122, and one or more notification services 130. The notification services 130 can provide a variety of different services and functionality in connection with notification engine 120. For example, notification services 130 can include client services 132, corresponding to applications and configurations which an end user device can install or otherwise implement on a device 150 in order to receive notifications from individual services of the notification system 100. As described with an example of FIG. 3, the synchronization service 134 can implement functionality for synchronizing local data sets amongst computers and devices which share an application platform and data store. As described with an example of FIG. 4, the security service 136 can operate to generate push notifications for receiving devices as part of a process in which a computer system or device is to be authenticated for communications with another computer system or device. As described with an example of FIG. 2, a location delay conditional ("LDC") notification service 138 can implement functionality for enabling end user devices to receive and store notification data, and further, to locally generate and trigger notifications when predetermined conditions are present.

In variations to examples such as shown with FIG. 1, the notification system 100 can be provided with more or fewer services. Additionally, while some examples are described in context of the notification system 100 and notification services 130 being part of a common network service or entity, variations provide that the network services 130 are operated remotely and independently from the notification system 100.

In an example of FIG. 1, the mobile device 150 can include a network interface 112, a notification interface 114, and one or more application components 116. Each of the application components 116 can correspond to an application or application platform that is configured to receive push type notifications from the notification system 100. In some examples, the application component 116 can be installed or configured (e.g., plug-in for third-party application) using instructions from the notification system 100 (e.g., client services 132). In some variations, the components of device 150, including the network interface 112, notification interface 114 and application component 116 can originate from an enterprise specific platform, administered and managed by administrators. In operation, the notification system 100 can manage components providing each of the one or more notification services 130. Each notification service 130 which is in use can receive communications from a corresponding component on the mobile device 150. The individual notification services 130 can receive the communications via the device interface 110, and the service interface 122 can route or apply the communication to the components of the intended service.

For some usage scenarios, the device interface 110 can receive an incoming communication and use the device store 126 to determine whether a user and/or operator profile exists for the device identifier. The device identifier can be referenced with a user profile 123 and/or operator profile store 124. In this way, for a given incoming communication 121, a determined set of profile information can be used to augment or otherwise identify the device, user, permission level, service level, and/or other facets of the mobile device 150 or user with respect to the notification system 100. The device interface 110 can associate the incoming communication 121 with parameters and other information determined from profile information or other resources of the notification system 100. In some variations, the service interface 122 can determine the particular services to receive the incoming communication. By way of example, the incoming communications can serve a variety of purposes, such as configuring operation of the selected notification services 130 or providing status information (e.g., network status, location, connectivity, etc.). In some variations, incoming communication 121 can also include requests for non-push communications, which, depending on the implementation, can be provided through one of the notification services 130. Still further, in other variations, the incoming communication 121 can instructions to modify the operating parameters of a connected device (e.g., accessory device, vehicle, etc.). The instructions may be implemented while simultaneously or concurrently notifying the user.

Each of the notification services 130 can also operate independently to generate notifications in accordance with programming and logic of that particular service. Some of the notification services 130 are described in greater detail with examples provided below. Each of the notification services 130 can generate notification data, including a notification header and/or content (or body) which the service interface 122 can generate or assemble into an outgoing notification 131 that is addressed to the intended device 150. In the example shown, network interface 112 can receive and process the outgoing notification 131 as described with examples below.

In operation, device 150 can communicate with notification system 100 using the network interface 112. The network interface 112 can correspond to, for example, a programmatic component that maintains or is otherwise able to establish a communication channel with notification system 100 over a network such as the Internet. The mobile device 150 can communicate outbound communications, such as requests made in response to or independent of receiving push notifications, as well as information which identifies the device and/or its user (e.g., account information etc.). The network interface 112 can receive various types of communications from device 150, including push notifications, messages, or client-server type communications generated from the mobile device 150.

In an example shown by FIG. 1, when an incoming notification is received by the network interface 112, the notification interface 114 can process the notification and select the application component 116 that is to receive the notification. The application component 116 can handle notification in accordance with rules, personalization and logic of the particular application.

In some examples, the mobile device 150 includes an aggregation component 118, which can collect and aggregate notifications received by multiple different applications that are application platforms of the mobile device 150. The notifications 131 can be received from one or multiple different notification systems or services. Thus, the application component 116 does not have to be platform specific to the notification system 100. Rather, the mobile device 150 can utilize application components 116 which receive notifications from multiple independent sources. The aggregation component 118 can sort and otherwise organize notifications that have been received and processed by the different applications operating on the mobile device 150, and the aggregation component 118 can store the collection of notifications with the persistent notification store 125. The user interface, shown as notification inbox 127 can interact with the persistent notification store 128, in order to enable the notifications to be viewed, and subjected to user interaction and or/other functionality.

Figure 2:
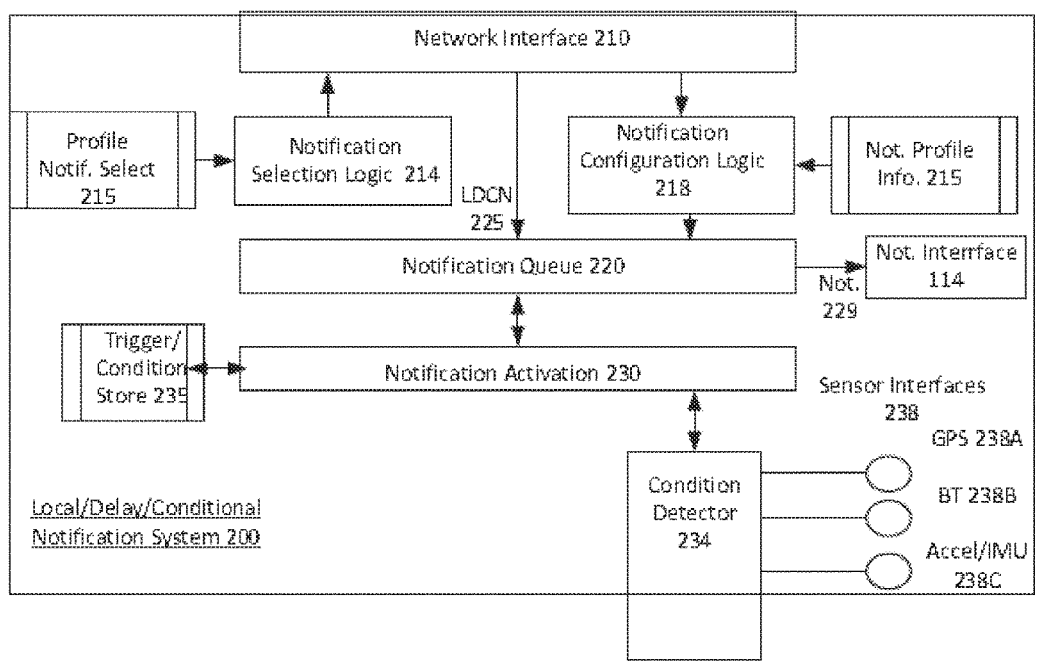
FIG. 2 illustrates implementation of a location delay conditional ("LDC") notification system, which can be implemented as a service of a notification system such as shown with an example of FIG. 1, according to one or more examples, according to one or more examples.

FIG. 2 illustrates implementation of a location delay conditional ("LDC") notification system, according to one or more examples. An LDC notification system 200 can be implemented using, for example, one or more applications 116 operating on the mobile device 150. For example, the LDC notification system can be implemented on the mobile device 150 of FIG. 1, and the network interface 210 can provide an example of an implementation of the network interface 112. With further reference to examples of FIG. 1 and FIG. 2, the LDC notification system 200 can operate to access the LDC service 138 of notification system 100, in order to receive and store LDC notifications 225 for conditional and local activation at a later time. For example, a connected accessory or vehicle could be instructed to change operating parameters at a certain location and notify the user. As another example, a connected aircraft application could be pre-populated to send notifications at pre-defined waypoints for tracking purposes.

In an example of FIG. 2, the LDC notification system 200 includes the network interface 210, a notification queue 220, a notification activation component 230, and a sensor monitor 234. In one implementation, notification selection logic 214 can be implemented to communicate with the notification system 100 via the network interface 210. The notification selection logic 214 can determine selection criteria for selecting LDC notifications 225 individually, by type (e.g., geo-fenced or proximity notifications) or by parameter (e.g., specific geographic perimeter). Once determined, the notification selection logic 214 can communicate the selection criteria to the notification system 100 via the network interface 210. A user or operator can subscribe to, for example, the LDC service 138 using either the mobile device 150 or another computer (e.g., through a web browser). In one implementation, the LDC notification system 200 can trigger the mobile device 150 in obtaining LDC type notifications 225 on an ongoing basis. Alternatively, the LDC service 138 can communicate the LDC notifications 225 to the mobile device 150 automatically based on service logic. Among other examples, the LDC notification system 200 can operate to trigger LDC notifications 225 without network access (e.g., when the mobile device 150 is offline).

More generally, the LDC notification system 200 can receive LDC notifications 225 which trigger from a variety of different conditions. For example, some notifications may specify geo-fencing conditions, and some devices can implement only a limited number of geo-fences. In such instances, the notification selection logic 214 can use notification profile information 215 to select geo-fences that are most applicable as a condition of triggering one of the LDC notifications 225 on the mobile device 150. For example, the notification selection logic 214 can communicate selection criteria for notifications based on the location where the device is most frequently located, or a user's home or work locations.

In some variations, once an LDC notification 225 is received, notification configuration logic 218 can implement configurations that may further affect the manner in which the LDC notifications 225 are activated or otherwise used on the mobile device 150. The configurations can be in the form of, for example, determining parametric values, such as time of life for the notification, or how the notification will execute on the mobile device 150. The notification queue 220 can store LDC notifications 225 for possible activation, along with any parametric configurations for controlling aspects of executing the notification. The activation can be determined from a variety of parameters or conditions, which can be set by the user, operator, or by default. In some variations, the conditions can be intelligently determined, based on, for example, application of profile information 215 by the notification configuration logic 218. For example, the LDC notifications 225 can specify a notification for when a user is likely to be home, and that condition may be determined from the notification profile information 215.

The LDC notifications 225 can be locally stored in the notification queue 220 of the mobile device 150. The notification activation component 230 can monitor the sensor monitor 234 for conditions of triggering individual LDC notifications 225 which are present. The notification activation component 230 can include rules or other logic for determining when one or multiple conditions are present. In some examples, an incoming LDC notification 225 can be parsed by the network interface 210 for data that defines conditional parameters. The data that defines the conditional parameters can, for example, be included in the header of the LDC notification 225. For example, the LDC service 138 can include conditional parameters with the header of the notification and/or as associated metadata which can be communicated either with the notification or at different times (e.g., standing or persistent conditions for triggering locally stored notifications). The notification activation component 230 can include logic for selecting or otherwise configuring rules that determine when conditions are met for a given LDC notification 225. The conditional parameters 235 for determining when the LDC notifications 225 are to be activated can be associated with corresponding notifications and stored in a trigger condition store 235.

Various types of conditions can be implemented in connection with LDC notifications 225. In some implementations, the LDC notifications 225 encompass sensor conditions, such as provided by various types of sensor resources of the mobile device 150. The sensor resources can include GPS, wireless radios such as Bluetooth, as well as accelerometers and or inertial mass units. The LDC notification system can utilize one or more sensor monitors 234, which utilize sensor interfaces 238 in order to receive and interpret sensory input, and generate values which can then be processed for conditional determinations by the notification activation component 230. The mobile device 150 can include multiple sensor monitors 234 for different types of sensors and sensor information. In an example shown, the sensor monitor 234 can be implemented as part of the operating system of the device, or alternatively, as part of the service provided through another component or application. As an addition or alternative, LDC notification system 200 can implement sensor monitor 234 for different types of sensors.

According to some examples, the notification activation component 230 can operate to implement geo-fencing conditions, proximity conditions, timing conditions, and various types of sensor conditions reflecting specific actions or events (e.g., device shakes). The sensor monitor 234 can monitor the relevant sensory interfaces 238 in order to generate sensor values that are then processed by the notification activation component 230. The notification activation component 230 can monitor for when a trigger condition 235 is met. Once the trigger condition 235 of a particular LDC notification 225 is met, the notification activation component 230 selects and activates the corresponding notification 225 from the notification queue 220. The activated notification 229 can then be routed to the particular application or application resource that is to receive and use the notification 229. Thus, for example, the notification queue 220 can communicate the activated LDC notification 225 to the notification interface 114 of the mobile device 150, for deployment to one of the co-resident applications on the device. As an example, an insurance application could use location, accident history and recent sensor data to identify a risk situation and notify the user or change the operating parameters of a vehicle.

Figure 3:
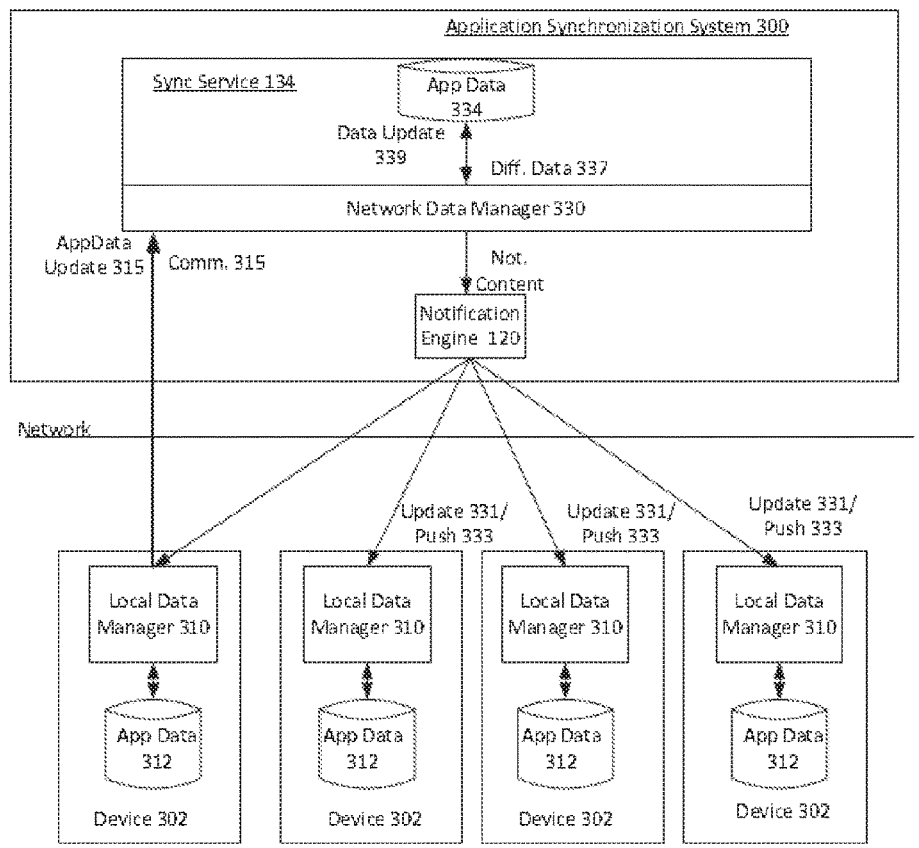
FIG. 3 illustrates implementation of an application synchronization system which can be implemented as a service of a notification system such as shown with an example of FIG. 1, according to one or more examples.

FIG. 3 illustrates implementation of an application synchronization system which can be implemented as one of the services of the notification system 100, according to one or more examples. In an example of FIG. 3, application synchronization system 300 includes a network side subsystem with functionality represented by network application data manager 330. The network application data manager 330 can maintain a corresponding network application data set 334. In some examples, the network application data 334 can provide a complete and current copy of application data shared by multiple computing devices 302. In this regard, the network application data 334 can maintain synchronized application datasets across multiple devices 302 on which a corresponding application data manager 310 is provided. The network application data set 334 can correspond to a variety of different types of application data items, such as a database of emails, message records, personal information management records, database records, document store, and more.

According to some examples, the application synchronization system 300 can be implemented with or as part of the notification system 100. The application synchronization system 300 can enable the generation of push notifications, communicated by, for example, the notification engine 120. Additionally, in some variations, the push notification can include or otherwise identify synchronization information for use by receiving devices 302.

According to some examples, the network application data manager 330 can maintain a network set of application data 334, which can further be distributed and synchronized amongst a set of devices 302 designated to share or implement local copies of the application data 334. In an example of FIG. 3, a local instance of the network data manager 330, shown by local data manager 310, can reside on individual devices 302. The devices 302 can correspond to computing devices (e.g., mobile computing devices, personal computer, portable computer, etc.) that are linked with the network data manager 330 and/or each other for purpose of maintaining synchronization of the respective local and network application data 312, 334. Accordingly, each local data manager 310, along with the network application data manager 330, can reside on a corresponding computing device that, for example, operates under the control of a common operator or entity (e.g., enterprise).

The network application data manager 330 and one or more local data managers 310 can combine to operate and maintain the local and network application data set 312, 334 synchronized when the respective application data is changed or altered. For example, each local data manager 310 can monitor the use of the corresponding local application data set 312 to detect events which change the local application data set. For example, the user may access the local application data set 312 through a user interface on the corresponding device 302. Through the interaction with the user interface, the user make changes to the local application data set 312 by adding new data, or by editing or deleting existing data. In variations, the local application data set 312 can be programmatically updated by connectors or programmatic interfaces to other application resources. For example, the local application data set 312 can be altered by a remote third-party content source which periodically updates the application data set 312 with new information.

According to some examples, when a change is detected to the local application data set 312 on one of the devices 302, the corresponding local data manager 310 can signal an application data update 315 to the network data manager 330. The application data update 315 can identify updated data of the local application data set 312, which may correspond to a portion of the local application data set 312. The application data manager 330 can update 339 the network application data set 334, and further identify differential data 337 for other devices to use in synchronizing their respective local application data sets 312. The application data manager 330 can utilize, for example, the notification engine 120 to enable other devices 302 which have other instances of the local application data set 310 to initiate synchronization processes. In one implementation, the network data manager 330 generates an update notification 331 for delivery to each device 302 that is in need of updating its copy of the local application data 312. The notification engine 120 can communicate a push notification 331 to each of the identified devices in need of updating their respective application data set. The push notification 331 can trigger the receiving devices 302 to access the network data manager 330 to receive the differential data 337. In this way, the other devices 302 can be triggered to synchronize or otherwise update their respective local application data set 312 based on the application data update 315.

In some variations, the network data manager 330 initiates a push notification 333 that includes instructions for enabling a respective receiving device 302 to synchronize without further access to the network data manager 330. Specifically, the push notifications 333 can include instructions and data for enabling the receiving devices to perform operations that are needed for enabling synchronization. The instructions can, for example, replicate the generation of the differential data 337. For example, one of the devices 302 can generate the application data update 315, and the network data manager 330 can determine a set of operations which can be performed on each of the other devices 302 in order to make the respective application data sets 312 on those devices current. The set of operations 333 can be identified and sequenced in individual notifications 333, communicated by the notification engine 120.

In variations, the local data manager 310 residing on the device on which the update is received can identify the operations which are needed to update the application data sets. The application data update 315 can thus identify operations and parameters which were performed on the particular device 302 and which resulted in changes to the application data set 312 resident on that device. In this way, the network data manager 330 can generate a communication 335 which identifies one or more operations which can be implemented independently on each receiving device 302 in order for the local application data set 312 that is resident on each receiving device 300 to be updated in to the current state. The communication 335 can also specify parametric data, for use with the operations in making the application data sets 312 current. The notification engine 120 can convert the communication 335 into one or more push notifications 333 for each of the devices 302. The push notifications 333 can be received by those devices 302 which are to be updated, and data contained in each of the respective push notifications 333 can be used by the local data manager 310 in performing operations that synchronize or otherwise update the respective local application data set 312 to be current and synchronized with the network application data set 334.

Thus, as compared to many conventional approaches which require receiving devices 302 to pull data from the server when application data sets are being synchronized, an example of FIG. 3 utilizes push notification 331, 333 to minimize the latency in which shared application data sets amongst multiple devices are synchronized. Among other benefits, the push notifications 331, 333 can also reduce the network cost which would otherwise be needed under conventional approaches for maintaining synchronized application data sets amongst linked device. Additionally, examples as described improve the overall user experience in areas with spotty network coverage, as the notifications take less bandwidth than polling.

In one implementation, the update notifications 331 trigger the receiving devices 302 to access the network service in order to obtain information from the network data manager 330 for synchronizing the local application data sets 312. In variations, the notification engine 120 generates the push notifications 333 to identify the operations and parametric information for enabling the select receiving devices 302 to independently perform their own operations for placing the local application data 312 in the current or synchronized state. As compared to conventional approaches, in such variations, the push notifications 333 eliminate the need for each receiving device 302 to perform a retrieval or request of the network service for synchronized data or information. Rather receiving devices 302 can receive push notifications 333 that include instructions for enabling the receiving device to independently (e.g., without accessing the network service) make the respective application data 312 current. By way of example, the instructions can identify what operations are to be performed on the local application data set 312, parametric information for use in performing the operations, and/or data for sequencing the operations according to an appropriate order.

Figure 4:
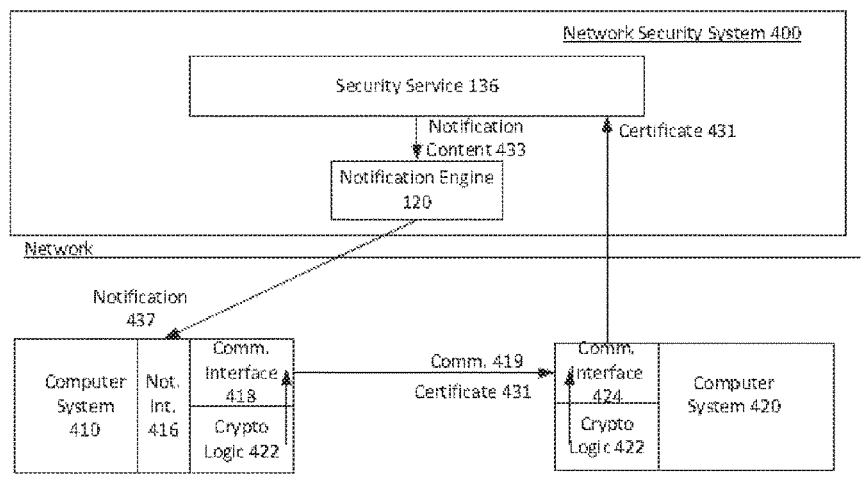
FIG. 4 illustrates an implementation of a network security system which can be implemented a service of a notification system such as shown with an example of FIG. 1, according to one or more examples.

FIG. 4 illustrates an implementation of a network security system which can be implemented as one of the services of notification system 100, according to one or more examples. In more detail, a network security system 400 can be implemented as or with security service 136 of the notification system 100, so as to enable use of notifications generated using notification engine 120. The network security system 400 can provide a security service in which one computer can be authenticated when communicating with another computer. In an example of FIG. 4, the network security system 400 can authenticate a first computer system 410 to a second computer system 420.

More generally, in some examples, the network security system 400 can provide a security service for authenticating a client computer (e.g., first computer 410) and a server (e.g., second computer system 420). In variations, alternative computing environments can utilize the network security system 400 such as shown and described with FIG. 5.

According to one aspect, the network security system 400 can provide a security feature that is used in connection with a multi-step authentication process. For example, in a first step, one of the computer systems (e.g., first computer system 410) initiates a communication in which a credential exchange is initiated. The the first and second computer systems 410, 420 can send a certificate or other credential for purpose of establishing a secure communication channel and/or access, by which, for example, the first computer system 410 can gain access to a resource that is protected through the second computer system 420.

However, examples as described recognize that the second computer system 420 may be vulnerable to a "man in the middle attack" in which communications between the computer systems are relayed to an attacker who can then impersonate one computer system to the other. Absent some safeguard, an attacker can gain access to the protected resource by assuming a credential or other identifier of the first computer system 410. Under conventional approaches, the second computer system 120 (e.g., server) can send a communication to the first computer system 410 to authenticate that computer system as being the true party that is represented by the communications of the first computer system 410. However, the vulnerability in which communications between the computer systems are relayed to the attacker may remain. Thus, while a multi-tier authentication processes exist for establishing secure communications between two (or more) computer systems, such conventional approaches can still be vulnerable to a "man-in-the-middle attack".

An example of FIG. 4 recognizes such vulnerability and provides for the use of push notifications to bypass the potential threat that may result from the first computer system 410 being compromised. According to some examples, the second computer system 420 can communicate with the security service 136 in order to generate the push notification for the first computer system 410. The push notification can be communicated through an encrypted channel, and as it utilizes an alternative communication channel (e.g., alternative protocol), the push notification bypasses any relay or spoof mechanism of attacker. The push notification can, for example, be delivered as a one-way (or unrequested) communication that is not paired to a client-side request and therefore not subject to being detected when communicated from the second computer system 420. In some variations the second computer system 420 can, for example, use the stored account information to trigger a push notification for an address or terminal that is associated with an identifier of the first computer system 410. The push notification can include, for example, a certificate which the first computer system 410 can use in communicating with the second computer system 420. As further examples, the push notification 435 can provide a security code, password, or other verification information which the first computer system 410 (or user thereof) can use as authentication for accessing a resource that is protected by the second computer system 420.

By way of example, in some implementations, the first computer system 410 can initiate communications 419 with the second computer system 420 using a communication interface 418. The communications 419 can be secured, such as provided by password or authentication cookie. However, to protect against an attack, the second computer system 420 can require the first computer system 410 to perform additional authentication, such as to confirm the first computer system 410 is still the entity communicating with the second computer system 420. According to an example of FIG. 4, the second computer system 420 can utilize cryptographic logic 422 and communication interface 424 to communicate a certificate 431 or other credential information to the security service 136. The security service 136 can generate notification content 433 which can then be handled and communicated by the notification engine 120 in generating the notification 437 to the first computer system 410. The security service 136 can utilize information provided by the second computer system 420 in determining how to address the notification 437. Alternative, the security service 136 can provide the service when, for example, the computer system that is to be authenticated is known to the security service 136. Still further, in some variations, the second computer system 420 can integrate the functionality described with the security service 136 and notification engine 120.

In an example of FIG. 4, the first computer system 410 can receive the notification 437 via a push interface 416. The first computer system 410 can use cryptographic logic 422 to extract the certificate 431 from the notification 437. The first computer system 410 can communicate the certificate 431 to the second computer system 420 via the communication channel 418. The second computer system 420 can authenticate that the computer which is accessing the protected resource is the first computer system 410 if the certificate 431 is provided by the first computer system 410 within a given time period from when the second computer system 420 issued the certificate via the security service 136. An example of FIG. 4 can provide an alternative to, for example, conventional approaches which require the first computer system 410 to reenter a password. Rather than reenter the password, the second computer system 420 can cause the user the first computer system to receive a security key via a push notification. The first computer system can be triggered by the push notification to use the security key in a communication exchange with the second computer system 420. The use of the security key can authenticate the first computer system 410 with respect to the second computer system 420. In some implementations, the first computer system 410 can implement the authentication (using the key received through push notification) so as to eliminate or reduce user involvement. By way of example, the second computer 420 can correspond to a server, and the second computer 420 can use push notification to trigger the first computer system (410) into authenticating itself. Among other advantages, use of push notification can enhance user experience and computational efficiency as compared to conventional approaches, such as those which require the user to manually reenter a password for purpose of receiving continued access to a website.

Still further, a first and second computer on which an example of FIG. 4 can be implemented may correspond to mobile devices of users that share or utilize a vehicle. In such an implementation, an example such as described with FIG. 4 may be used to securely transfer a digital content package (e.g. vehicle key) between one driver and another driver. Among other benefits, such an implementation may enable users to wirelessly exchange the key needed to operate a shared vehicle, adding convenience and control to the use of the vehicle key by one or both users.

Figure 5:
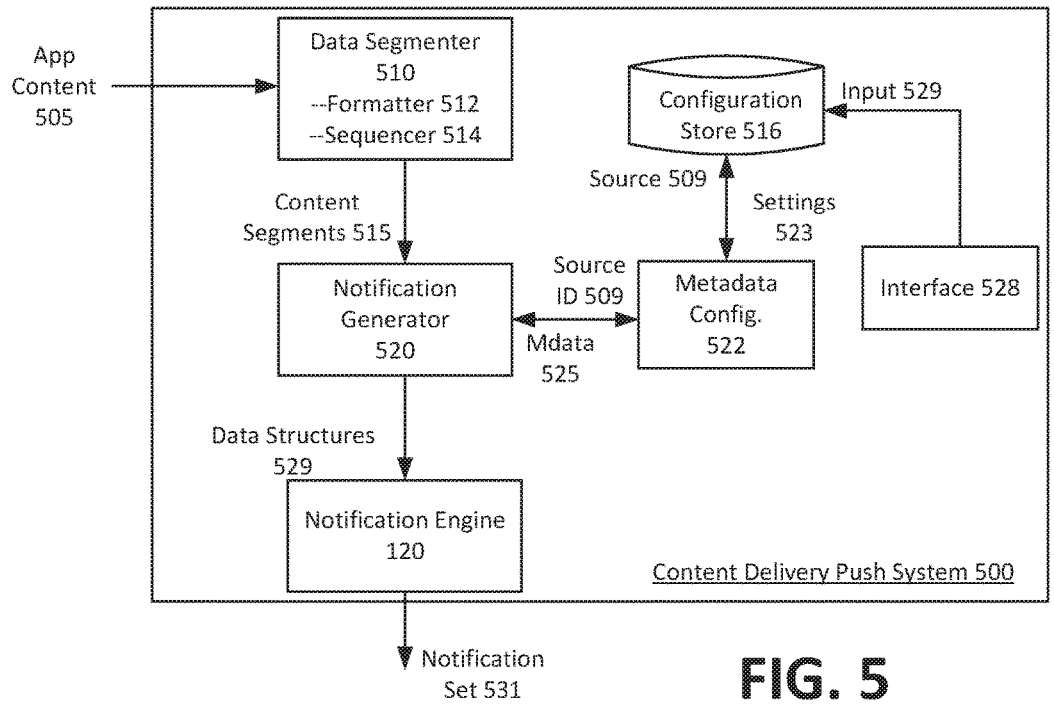
FIG. 5 illustrates implementation of a content delivery push system which can be implemented as a service of a notification system such as shown with an example of FIG. 1, according to one or more examples.

FIG. 5 illustrates implementation of a content delivery push system which can be implemented as one of the services of the notification system 100, according to one or more examples. In an example of FIG. 5, content delivery push ("CDP") system 500 includes a network side functionality represented by data segmenter 510, notification generator 520 and metadata configuration logic 522. Collectively, the components of the CDP system 500 operate to deliver application content that originates from a network service or resource, to one or more mobile devices (e.g., mobile devices 150, as shown with FIG. 1) in the form of a series of push notifications 531.

In an example of FIG. 5, the data segmenter 510 retrieves or receives application content 505 from, for example, another network service or application that is used by the mobile device 150. By way of example, the application content 505 can be data that is retrieved or otherwise provided from an email service, chat service, web service, or website (e.g., an article). The data segmenter 510 segments the application content 505 into content segments 515 that are of sufficient size to be transported as the payload of an outbound notification. In some implementations, the data segmenter 510 determines the notification size suitable for the mobile device 150, based on, for example, the computing platform and/or other applications in use on the computing device. For example, the content segmenter 510 may select a data size of 2K or 4K for the mobile device 150 based on the platform of the mobile computing device. With the segment size determined, the data segmenter 510 generates a corresponding number of segments for the application content 505 of a given size.

In some examples, the data segmenter 510 includes logic for implementing one or more optimizations with respect to including relevant portions of the application content 505 in relatively small payloads of notifications. The optimizations may include sizing the application content 505. For example, the data segmenter 510 can include a formatter 512, which can parse the application content for textual content, separated from images (e.g., images, advertisement, etc.) or headers which may accompany the application content 505 at the source.

As an addition or alternative, the data segmenter 510 may include sequencing logic 514, which sequences the content segments 515. The sequence of the content segments 515 can, for example, be based on an inherent structure or sequence of the content resident at the source.

The notification generator 520 may generate multiple data structures 529, each of which correspond to a payload and header for a corresponding notification. The data structures 529 can be used by the notification engine 120 to generate a set of push notifications 531 for the mobile device 150. In some examples, the data structures 529 may be associated or otherwise generated to include metadata 525 to configure the manner in which the notifications 531 are consumed on the mobile device 150. The push notification set 531 can include multiple notifications which can be processed on the receiving device in accordance with a sequence or other structure to generate an output (e.g., file, data set, content).

With reference to FIG. 1, the mobile device 150 can include an application 116 that can process the push notification set 531 in accordance with a predetermined sequence or configuration. For example, the mobile device 150 may include a universal application for receiving notifications, and the application may process notifications provided in set form in sequence of receipt to generate the output.

In some examples, the notification generator 520 includes or otherwise utilizes metadata configuration logic 522 to provide configuration metadata 525 with the notification set 531. In some examples, the metadata 525 can identify a total number of notifications that are included with the notification set 531 (e.g., based on the number of content segments 515). As an addition or alternative, the metadata configuration logic 522 can determine and specify a sequence of each segment (when communicated as a notification) to the mobile device 150.

For example, the metadata configuration logic 522 can determine that a particular notification set 531 for a given mobile computing device is to include 5 notifications. The metadata configuration logic 522 may generate metadata for each individual notification of the set that specifies the sequence number of the notification, as well as the total number of notifications in the set. In the given example, the metadata would identify notifications of the set as "1 of 5", "2 of 5" etc. Thus, for the particular notification set 531, the metadata 525 can specify a constant value (e.g., the total number of notifications), or a variable value (the sequence number of each notification).

Still further, in some variations, the metadata 525 is associated with each notification of the notification set 531. In other variations, the metadata 525 is provided selectively to one or some notifications of the set (but not all).

The notification generator 520 may include or otherwise provide the configuration metadata 525 with the notification set 531 in a variety of forms. In one example, the configuration metadata 525 can be packaged as, for example, a component of the header for each of the individual notifications that are part of the notification set 531. Still further, each notification can be associated with a metadata object that wraps the notification (or the payload).

As another variation or addition, the metadata configuration logic 522 may generate metadata 525 that encodes a specific parameter (e.g., to specify a rule) to configure the manner in which the mobile device 150 consumes the collective set of notification 131. For example, the metadata 525 can specify whether the mobile device 150 attempts to collectively process the payloads of the notification set 531 when one or more of the notifications are not present on the receiving device. The metadata 525 can alternatively specify whether the mobile device 150 initiates consumption of the notification set 531 upon receipt of the first notification, the last notification or another one of the notifications.

According to some example, the metadata configuration logic 522 generates metadata that is configured for the application content 505 (or its content segments). In one implementation, the configuration logic 522 responds to input that identifies a source 509 of the application content 505. For example, metadata configuration logic 522 may select the metadata 525 for the notification set 531 from a configuration store 516 based on the source 509 of the application content 505.

In some examples, the metadata configuration logic 522 can select the settings 523 based on a profile associated with the mobile device 150. For example, the application content 505 (or other input) may identify the user profile as a "heavy hitter" of web service, and the metadata configuration logic 522 may select the settings 523 based on the user profile identifier. According to some examples, an interface 528 can enable a developer or administrator to specify input 529 to associate a setting with a particular user profile, user category, or source.

Figure 6:
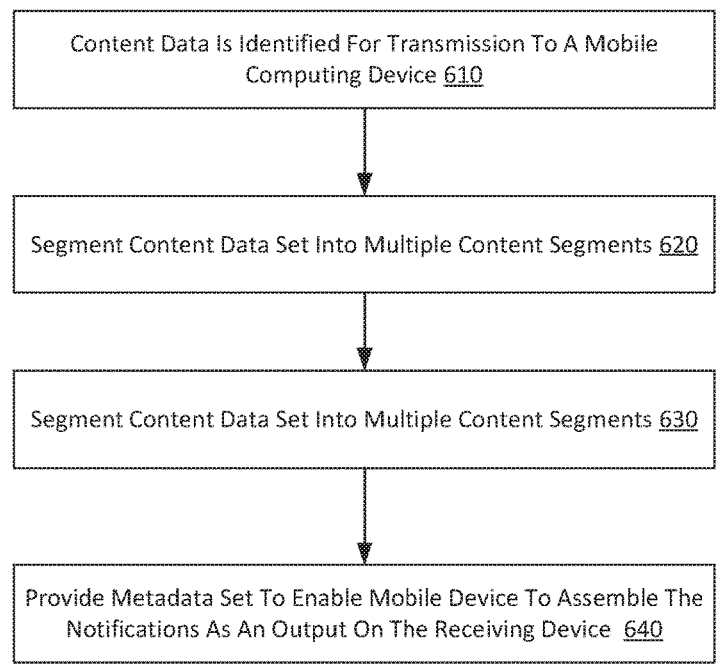
FIG. 6 illustrates a method for delivering content to a mobile computing device.

FIG. 6 illustrates an example method for delivering content to a mobile computing device. In describing an example of FIG. 6, reference may be made to elements of FIG. 1 or FIG. 5 for purpose of illustrating a suitable component or element for performing a step or sub-step being described.

According to some examples, content data is identified for transmission to a mobile computing device (610). For example, a push notification service (e.g., CDP 500) can access or otherwise retrieve messages, chats, web content or other network resources from a given source. The CDP 500 can be configured to perform the retrieval in response to, for example, an event (e.g., incoming message) or passage of time (e.g., periodic).

Once identified, the content data set is segmented into multiple content segments (620). The size of each content segment may be determined by, for example, a computing platform in use on the mobile device 150.

According to some examples, each of the multiple content segments can be sent to the mobile computing device as a push notification (630). Thus, the mobile device 150 is not triggered by a push notification to perform a retrieval, but rather receives the collective payload of all of the push notifications at one time. Moreover, the individual notifications can be communicated in a manner that identifies the notifications as part of a set, representing the application data 505.

According to some examples, a metadata set may be provided with the set of push notifications 531, and the metadata set may specify a configuration to assemble the multiple content segments as an output on the receiving device (640). For example, each notification of the notification set may include a metadata object that wraps the payload of the corresponding notification. On receipt, the mobile device 150 determines one or more rules or settings for consuming the collective payload data of the notifications. The output may correspond to, for example, a file, a data set, or a content rendered on the mobile device 150.

Figure 7:
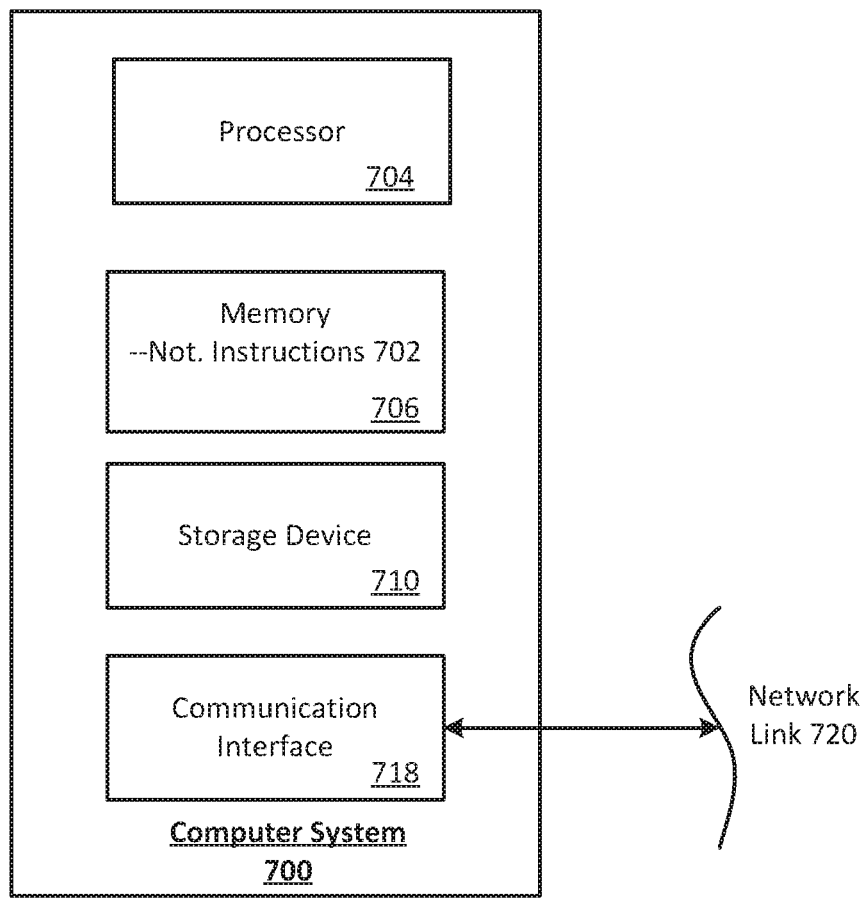
FIG. 7 is a block diagram that illustrates a computer system upon which aspects described herein may be implemented.

FIG. 7 is a block diagram that illustrates a computer system upon which aspects described herein may be implemented. For example, in the context of FIG. 1, a notification system 100 may be implemented using one or more servers such as described by FIG. 7.

In an embodiment, computer system 700 includes processor 704, memory 706 (including non-transitory memory), storage device 710, and communication interface 718. Computer system 700 includes at least one processor 704 for processing information. Computer system 700 also includes the main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) or other static storage device for storing static information and instructions for processor 704. The storage device 710, such as a magnetic disk or optical disk, is provided for storing information and instructions. The communication interface 718 may enable the computer system 700 to communicate with one or more networks through use of the network link 720 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative aspects, hard-wired circuitry may be used in place of or in combination with software instructions to implement aspects described herein. Thus, aspects described are not limited to any specific combination of hardware circuitry and software.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many mobile phones and consumer electronic devices) and magnetic memory. Computers, terminals, network enabled devices (e.g., mobile devices such as mobile phones) are all examples of machines and devices that utilize processors, memory, and instructions stored on computer-readable mediums. Additionally, embodiments may be implemented in the form of computer-programs, or a computer usable carrier medium capable of carrying such a program.

Figure 8:
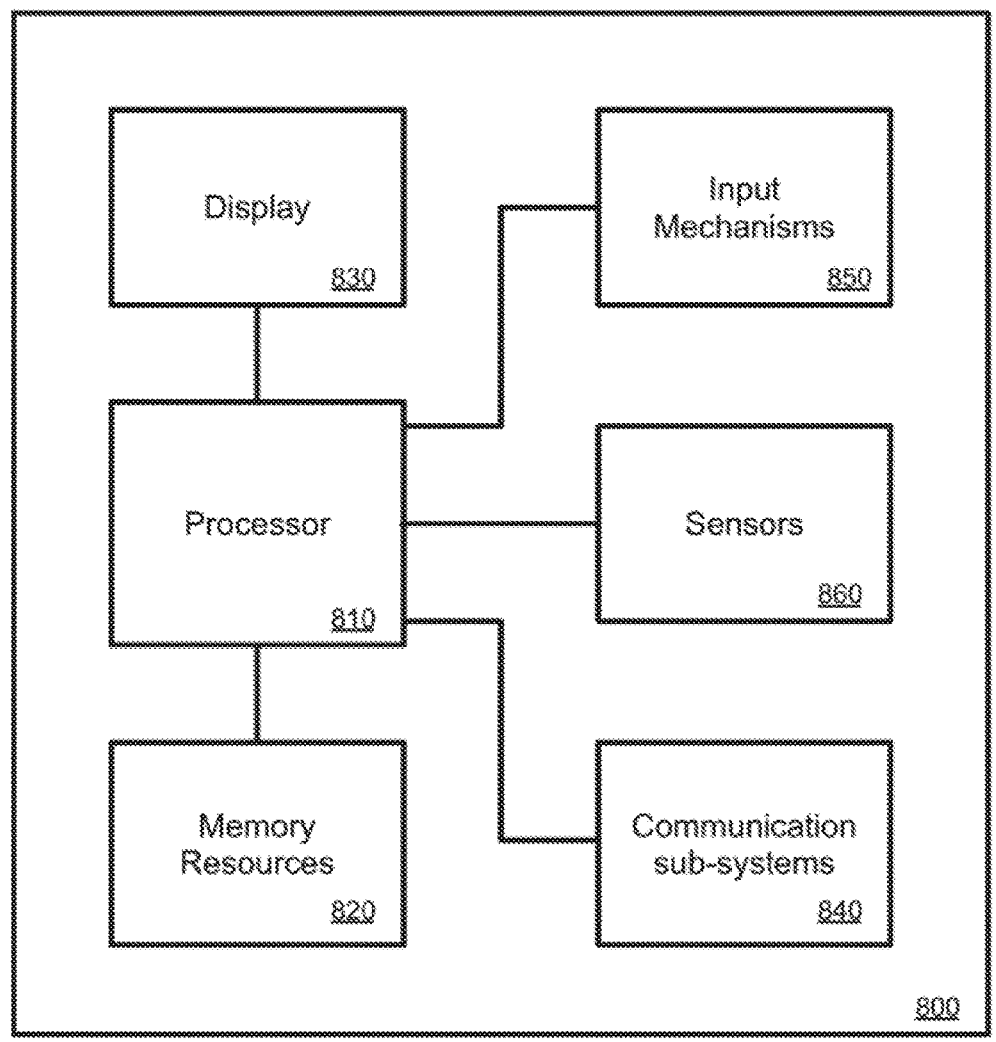
FIG. 8 is a block diagram that illustrates a mobile computing device upon which embodiments described herein may be implemented.

According to an example of FIG. 7, notification instruction set 702 may be stored in the memory 706, and executed by processor 704 to implement functionality such as described with examples above. For example, the instruction set 702 may be used to implement example systems such as described with FIG. 1 through FIG. 5. Additionally, the instruction set 702 may be executed to perform an example method such as described with an example of FIG. 6. FIG. 8 is a block diagram that illustrates a mobile computing device upon which embodiments described herein may be implemented. In one embodiment, a computing device 800 may correspond to a mobile computing device, such as a cellular device that is capable of telephony, messaging, and data services. The computing device 800 can correspond to a client device or a driver device. Examples of such devices include smartphones, handsets or tablet devices for cellular carriers. The computing device 800 includes a processor 810, memory resources 820, a display device 830 (e.g., such as a touch-sensitive display device), one or more communication sub-systems 840 (including wireless communication sub-systems), input mechanisms 850 (e.g., an input mechanism can include or be part of the touch-sensitive display device), and one or more sensors (e.g., a GPS component, an accelerometer, one or more cameras, etc.) 860. In one example, at least one of the communication sub-systems 640 sends and receives cellular data over data channels and voice channels.

The processor 810 can provide a variety of content to the display 830 by executing instructions and/or applications that are stored in the memory resources 820. For example, the processor 810 is configured with software and/or other logic to perform one or more processes, steps, and other functions described with implementations, such as described by FIGS. 1 through 5, and elsewhere in the application. In particular, the processor 810 can execute instructions and data stored in the memory resources 820 in order to operate a client service application. Accordingly, mobile computing device 800 may be used to implement mobile device 150 of FIG. 1, as described with various examples.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for operating a mobile computing device, the method comprising:
 (a) receiving, on the mobile computing device, each of (i) a trigger associated with a predefined condition or event, and (ii) a plurality of notifications for use by a plurality of applications;
 (b) when the mobile computing device is without network access, detecting, by the mobile computing device, the predefined condition or event; and
 (c) in response to detecting the predefined condition or event, activating, by the mobile computing device, at least one of the plurality of notifications based on the trigger, wherein activating the at least one of the plurality of notifications includes determining which of the plurality of applications are to receive the activated notification.

2. The method of claim 1, wherein (a) includes obtaining notification data from a network service, wherein the plurality of notifications are based on the notification data.

3. The method of claim 1, further comprises enabling a user to define each of the plurality of notifications, the trigger, predefined condition or event, and/or notification data.

4. The method of claim 1, wherein the predefined condition or event corresponds to at least one of a geographic condition or a proximity condition.

5. The method of claim 1, wherein the determining which of the plurality of applications are to receive the activated notification is based on which of the plurality of applications correspond to the activated notification.

6. The method of claim 2, wherein (a) includes receiving the notification data as the trigger when the mobile computing device is online, the notification data originating from a network service.

7. The method of claim 6, wherein (b) includes using sensing data local to the mobile computing device to detect the predefined condition or event.

8. The method of claim 7, wherein (c) is performed without use of the network service.

9. The method of claim 1, wherein (b) and (c) are performed when the mobile computing device is offline.

10. A mobile computing device comprising:
 one or more processors;
 a memory;
 network resources, including a network interface to exchange communications with an external source;
 wherein the one or more processors:
 use the network resources to receive (i) notification data for a plurality of notifications from the external source, each notification of the plurality of notifications corresponding to an application being executed on the mobile computing device and (ii) data that defines a condition for activating the notification, wherein at least one of the plurality of notifications is associated with the data that defines the condition;

store the plurality of notifications in the memory that is based on the notification data;

detect an occurrence of the condition using local resources of the mobile computing device; and in response to detecting the occurrence of the condition, locally activate the at least one of the plurality of notifications without use of the network resources, wherein activating the at least one of the plurality of notifications includes determining which of a plurality of applications are to receive the activated notification.

11. The mobile computing device of claim 10, wherein the one or more processors activate the notification by processing each of the plurality of notifications as a push notification.

12. The mobile computing device of claim 10, wherein the one or more processors determine the data that defines the condition from a header of each of the plurality of notifications of the notification data.

13. The mobile computing device of claim 10, wherein the condition corresponds to a geographic condition.

14. The mobile computing device of claim 13, further comprising:

one or more sensors, and
wherein the one or more processors use the one or more sensors to detect the occurrence of the condition.

15. The mobile computing device of claim 14, wherein the one or more sensors include at least one of a Global Positioning System (GPS) unit, accelerometer, inertial mass unit, or magnetometer.

16. A non-transitory computer readable medium that stores instructions, which when executed by one or more processors of a mobile computing device, cause the of a mobile computing device to:

(a) receive each of (i) a trigger associated with a predefined condition or event, and (ii) a plurality of notifications for use by a plurality of applications;

(b) when the mobile computing device is without network access, detect the predefined condition or event; and (c) in response to detecting the predefined condition or event, activate at least one of the plurality of notifications based on the trigger, wherein activating the at least one of the plurality of notifications includes determining which of the plurality of applications are to receive the activated notification.

17. The non-transitory computer readable medium of claim 16, wherein the instructions for (a) further includes obtaining notification data from a network service, wherein the plurality of notifications are based on the notification data.

18. The non-transitory computer readable medium of claim 16, wherein the instructions further cause the mobile computing device to:

enable a user to define the notification, the trigger, predefined condition or event, and/or notification data.

19. The non-transitory computer readable medium of claim 16, wherein the predefined condition or event corresponds to a geographic condition.

20. The non-transitory computer readable medium of claim 16, wherein the predefined condition or event corresponds to a proximity condition.

* * * * *